US012781076B2

(12) United States Patent
Alexander et al.

(10) Patent No.: US 12,781,076 B2
(45) Date of Patent: Nov. 3, 2026

(54) AEROSOL-JETTABLE SILVER NANOPARTICLE-BASED CONVERTIBLE INK

(71) Applicants: Raytheon Company, Tewksbury, MA (US); The University of Massachusetts, Lowell, MA (US)

(72) Inventors: Gavin Alexander, Lowell, MA (US); Andrew M. Luce, Marlborough, MA (US); Christopher Areias, Londonderry, NH (US); Craig Alfred Armiento, Acton, MA (US); Susan C. Trulli, Lexington, MA (US); Alkim Akyurtlu, Arlington, MA (US); Oshada K. Ranasingha, Salem, NH (US)

(73) Assignees: RAYTHEON COMPANY, Waltham, MA (US); UNIVERSITY OF MASSACHUSETTS, Lowell, MA (US)

( * ) Notice: Subject to any disclaimer, the term of this patent is extended or adjusted under 35 U.S.C. 154(b) by 330 days.

(21) Appl. No.: 18/504,518

(22) Filed: Nov. 8, 2023

(65) Prior Publication Data

US 2025/0145845 A1 May 8, 2025

(51) Int. Cl.
*C09D 11/38* (2014.01)
*C09D 11/52* (2014.01)

(52) U.S. Cl.
CPC .............. *C09D 11/38* (2013.01); *C09D 11/52* (2013.01)

(58) Field of Classification Search
CPC ........ C09D 11/38; C09D 11/52; C09D 11/106
USPC .......................................................... 252/512
See application file for complete search history.

(56) References Cited

U.S. PATENT DOCUMENTS 8,383,014 B2 2/2013 Vanheusden et al.
2006/0163744 A1 7/2006 Vanheusden et al.
2011/0303885 A1* 12/2011 Vanheusden ............. H01B 1/02 977/773
2013/0133934 A1 5/2013 Flores et al.
(Continued)

FOREIGN PATENT DOCUMENTS

JP 2004056106 A * 2/2004
KR 20080029729 A * 4/2008 ............ B22F 1/0545

OTHER PUBLICATIONS

Translation of KR_20080029729_A_I (Year: 2008).*
(Continued)

*Primary Examiner* — Tri V Nguyen
(74) *Attorney, Agent, or Firm* — CANTOR COLBURN LLP

(57) ABSTRACT

A method of forming a convertible ink. The method includes: performing a polyol process with a metal salt, a capping agent and a solvent to produce encapsulated nanospheres in a first aqueous solution; reducing the amount of capping agent in the solution. The capping agent can be reduced by: adding solvent soluble with the capping agent and agitating the mixture via centrifugation to form a supernatant and a precipitate that includes the encapsulated nanospheres; removing the supernatant; adding a second solvent to the precipitate to form a second solution; agitating the second solution to form a second supernatant and a precipitate that includes the encapsulated nanospheres; and removing the second supernatant.

8 Claims, 6 Drawing Sheets

(56) References Cited

U.S. PATENT DOCUMENTS

| | | | |
|---|---|---|---|
| 2015/0166810 | A1 | 6/2015 | Fu et al. |
| 2022/0089895 | A1 | 3/2022 | Lysien et al. |

OTHER PUBLICATIONS

Mo 'Silver Nanoparticles Based Ink with Moderate Sintering in Flexible and Printed Electronics. Int. J. Mol. Sci. 2019, 20, 2124 (Year: 2019).*

Translation of JP_2004056106_A_H (Year: 2004).*

Notification of Transmittal of the International Search Report and the Written Opinion of the International Searching Authority, or the Declaration; PCT/US2024/054904; Feb. 10, 2025, 11 pages.

* cited by examiner

AEROSOL-JETTABLE SILVER NANOPARTICLE-BASED CONVERTIBLE INK

BACKGROUND

The present disclosure relates to convertible inks, and more specifically, to conductive convertible inks.

Convertible inks can be used to fabricate electronic structures. Examples of convertible inks include composite materials with an insulating phase after curing but which can be selectively converted to a conductive or resistive phase by methods such as a thermal treatment or laser sintering.

SUMMARY

According to one or more embodiments, a printable ink provided. In one embodiment, the ink includes silver nanoparticles coated with a polymer. The ink can be cured at a low temperature (e.g, 100-120 C) after which the ink is not conductive. Later, application of further energy, (e.g., laser light) can decompose polymer molecules and lead to spontaneous coalescence of silver nanoparticles to create conductive pattern.

In one embodiment, a method of forming a convertible ink is disclosed. The method includes: performing a polyol process with a metal salt, a capping agent and a solvent to produce encapsulated nanospheres in a first aqueous solution; reducing the amount of capping agent in the solution. The capping agent can be reduced by: adding solvent soluble with the capping agent and agitating the mixture via centrifugation to form a supernatant and a precipitate that includes the encapsulated nanospheres; removing the supernatant; adding a second solvent to the precipitate to form a second solution; agitating the second solution to form a second supernatant and a precipitate that includes the encapsulated nanospheres; and removing the second supernatant.

In addition to one or more of the features described above, or as an alternative to any of the foregoing embodiments, the capping agent can be Polyvinylpyrrolidone (PVP).

In addition to one or more of the features described above, or as an alternative to any of the foregoing embodiments, the first reducing agent can be ethanol.

In addition to one or more of the features described above, or as an alternative to any of the foregoing embodiments, the second reducing agent can be acetone.

In addition to one or more of the features described above, or as an alternative to any of the foregoing embodiments, the solvent can be a polyol.

In addition to one or more of the features described above, or as an alternative to any of the foregoing embodiments, the first reducing agent can be different than the second reducing agent.

In one embodiment, a method of forming conductive traces on a substrate is disclosed. The method can include: forming a convertible ink according to any prior method; applying the convertible ink to the substrate; curing the convertible ink to form cured ink; and forming the conductive traces by exposing the cured ink to laser light.

In addition to one or more of the features described above, or as an alternative to any of the foregoing embodiments, the laser light can be produced by an 830 nm laser.

In addition to one or more of the features described above, or as an alternative to any of the foregoing embodiments, the conductive traces can be formed due to a net reduction in the capping agent in the convertible ink from exposure to the laser light.

In addition to one or more of the features described above, or as an alternative to any of the foregoing embodiments, the method of forming the traces can include heating the substrate, wherein the convertible ink is cured by applying it to heated substrate.

In addition to one or more of the features described above, or as an alternative to any of the foregoing embodiments, the convertible ink can be cured in a vacuum oven.

In addition to one or more of the features described above, or as an alternative to any of the foregoing embodiments, the convertible can be applied by aerosol jet printing.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Convertible inks are composite materials with an insulating phase after being cured but which are selectively converted to a conductive or resistive phase by methods such as a thermal treatment or laser sintering. Convertible inks can include, for example, a composite blend of conductive particles and insulating particles/agents. A non-limiting example of a convertible ink includes polyvinylpyrrolidone (PVP) encapsulated silver nanoparticles.

As disclosed herein, a method of synthesizing an ink is disclosed. The synthesized ink will include metal nanoparticle spheres capped (e.g., surrounded) by a nonconductive, volatile capping agent. This ink can be synthesized such that it cures after a thermal treatment, into a non-conductive film. Advantageously, the synthesized ink can be effectively applied by an aerosol jet process to apply a non-conductive film of the ink onto a surface.

Application of a higher energy laser process, such as by selectively laser sintering the film using an ultraviolet or near infrared (NIR) laser, can cause the capping material to volatilize and results in the formation of a conductive trace. The laser process can be performed using any laser of any wavelength such that the output energy density is sufficient to volatilize the capping agent and initiate sintering of the conductive particles.

Figure 1B:
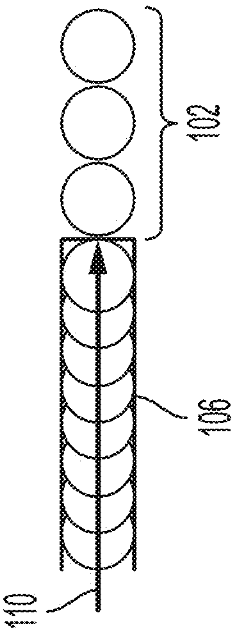
FIGS. 1B to 1D show more detailed views of the film before and after laser sintering.
Figure 1A:
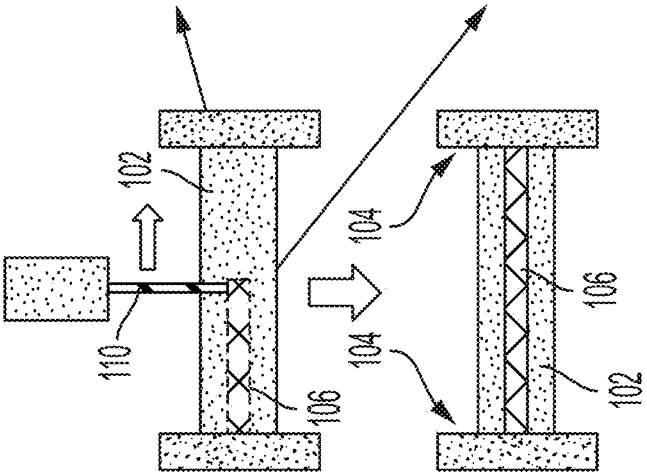
FIG. 1A is a laser sintering method for selectively converting part of the insulating film formed herein to a conductive/resistive path.

For example, FIG. 1A shows a laser sintering method for converting portions of the ink 102 formed herein (deposited as a film for example) to conductive/resistive traces 106. After curing, the ink 102 is a non-conductive film. A laser 110 converts the ink/film 102 to the conductive trace 106.

Figure 1C:
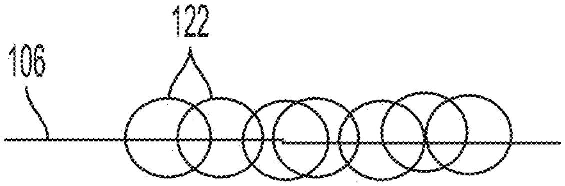

FIGS. 1B and 1C show expanded views of the ink 102 before and after being exposed to laser sintering or thermal sintering. The ink 102 includes a capping material/agent 120 that surrounds conductive nano-particles 122.

Exposure of the ink 102 leads to volatilization of the capping material/agent 120 which causes the localized conductive particles 122 to pack more tightly and fuse to become conductive to form traces 106 as illustrated in FIG. 1C.

Figure 1D:
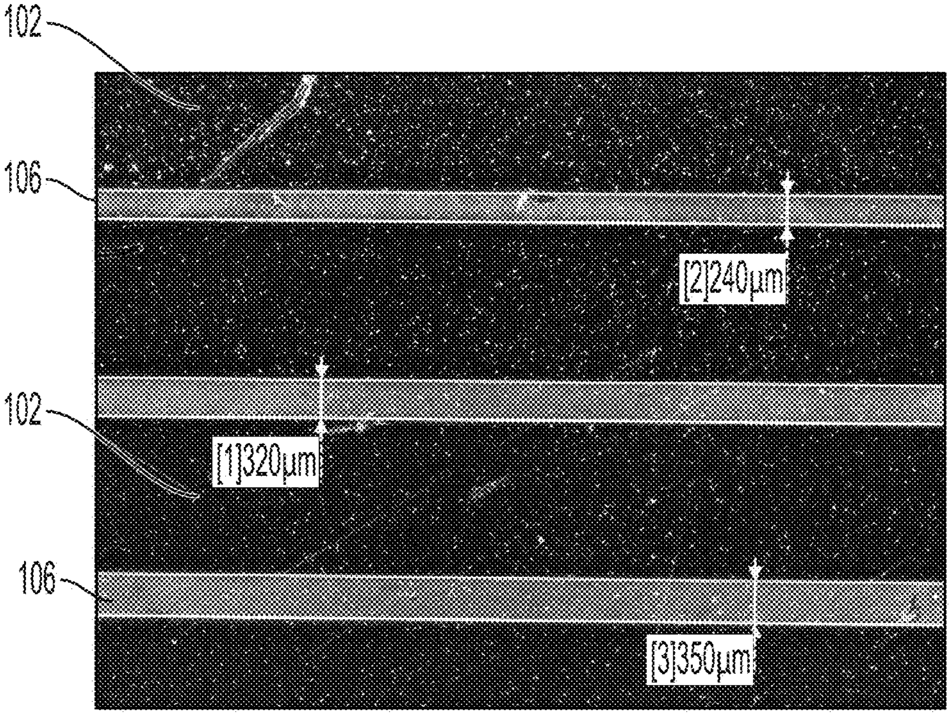

It should be noted that several traces 106 can formed from the film 102 as shown in FIG. 1D.

The convertible inks can be used as printable inks that are printed as films that can be easily patterned to create conductive traces by application of localized energy (e.g. thermal energy or laser). As opposed to some prior inks, the insulating material is included as part of the synthesis as the dispersant and is mostly absent from the final conductive traces. This property is useful should the ink need to be tuned to higher conductance since any insulating material present will hinder its conductivity and raise the dielectric constant.

The conductive particles 122 in the convertible ink include conductive metal particles. Non-limiting examples of conductive metal particles include silver particles, gold particles, copper particles, or a combination thereof. In the following figures, silver will be illustrated.

In each embodiment, the conductive particles 122 are in the convertible ink in an amount of about 2 to about 6 weight % (wt. %).

Figure 4:
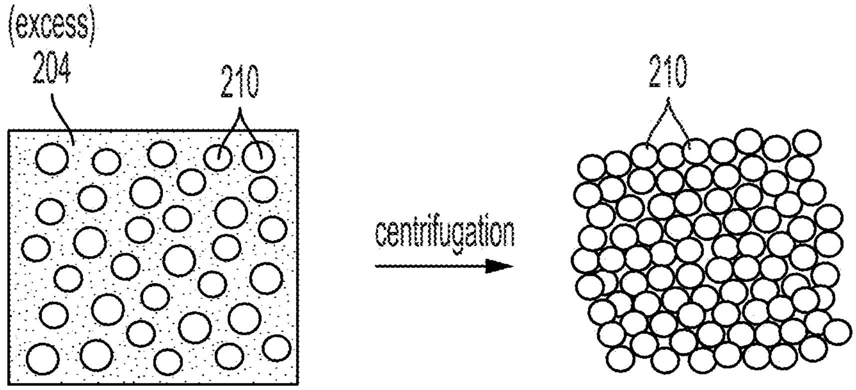
FIG. 4 demonstrates the effect of centrifugation on the resulting cured films by removing excess PVP.

In each embodiment, the average diameter of the conductive particles 122 is about 20 to about 100 nanometers (nm). The concentration of capping material should be high enough to see a homogenous dispersion without being so high that the particles are suspended far apart in the film as shown in FIG. 4.

The insulating portion 102 in the convertible ink includes an insulating material. A non-limiting example of the material of the insulating portion 102 is a polymeric capping agent such as polyvinylpyrrolidone (PVP). As noted above, application of a laser to the film 102 removes the capping agent 120 and allows conductive particles 122 to provide a path for electrical conduction.

Figure 2A:
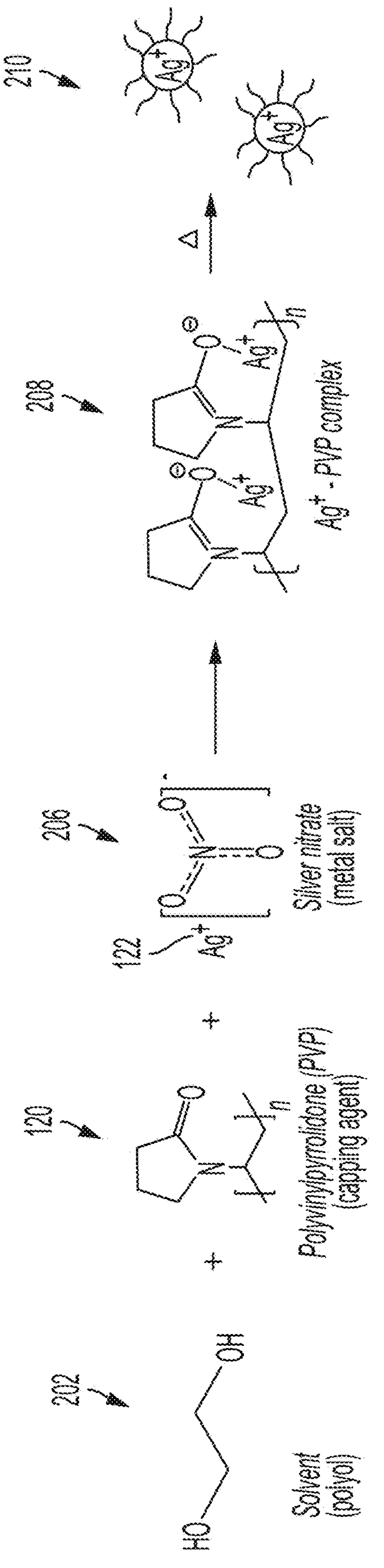
FIG. 2A shows beginning steps in preparing a convertible ink in one embodiment.

With reference now to FIG. 2A, to make the convertible ink, the conductive particles 122 and a capping agent 120 are combined in a solvent(s) 202 and optionally, one or more additives. Non-limiting examples of solvents 202 are polyols, 1-methoxy-2-propanol, ethylene glycol, or any combination thereof. In one or more embodiments, the solvent is a glycol solvent.

In FIG. 2A, the conductive particles 122 are shown to be part of a metal salt. As shown, the conductive particles 122 are part of a silver nitrite salt 206. When mixed, metal ions 122 in solution are saturated with PVP (reference number 208). After an isothermal reaction, metal spheres complex with PVP capping agent are produced as indicated by nanospheres 210. These nanospheres may be referred to as encapsulated nanospheres. In a non-limiting example, 100 ml of a suitable glycol 100 ml, 2 grams of PVP and 0.5 g of silver salt can be used to perform the polyol synthesis.

Figure 2B:
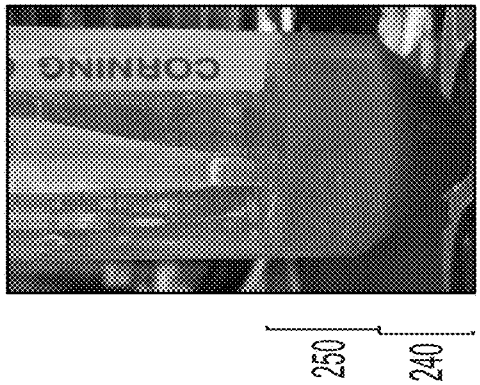
FIG. 2B shows the precipitate being separated from the fluid.
Figure 2C:
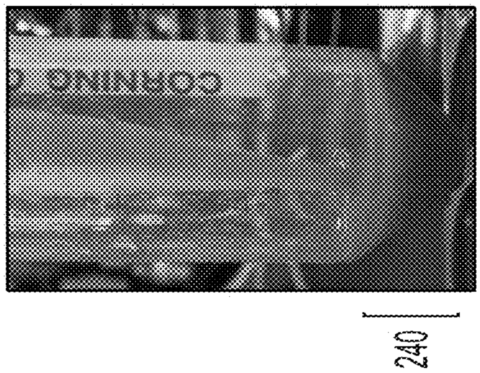
FIG. 2C shows the remaining precipitate that is then mixed with a different solvent and separated again to form the convertible ink.

With reference now to FIG. 2B, it shall be understood that the nanospheres 210 are in a solution that includes excess PVP. This solution can then have a first reducing agent (ethanol) added to it to dilute the solution. Subsequent centrifugation generates a precipitate 240 composed of nanospheres 210 and a supernatant 250. The supernatant 250 can be removed (FIG. 2C) and then acetone can be added and the solution centrifuged, then removal of supernatant can be repeated.

Finally, the concentrated precipitate can be redispersed in tripropylene glycol methyl ether (TGME) using an agitator such as a probe scintillator. The resultant ink can then be used to form traces.

In practice, the precipitate (e.g., TGME and precipitate mixture) can be applied to a substrate (see., e.g., FIG. 1) and cured.

Curing is performed by, for example, heating for a period of time. The temperature and time for curing will depend on the composition of the convertible ink. According to one or more embodiments, curing is performed by heating at a temperature of about 75 to about 150 degrees Celsius. In other embodiments, curing is performed by heating at a temperature of about 80 to about 100 degrees Celsius. The ink can be cured by an oven, a vacuum over, or by applying it to a heated substrate, for example.

Figure 3:
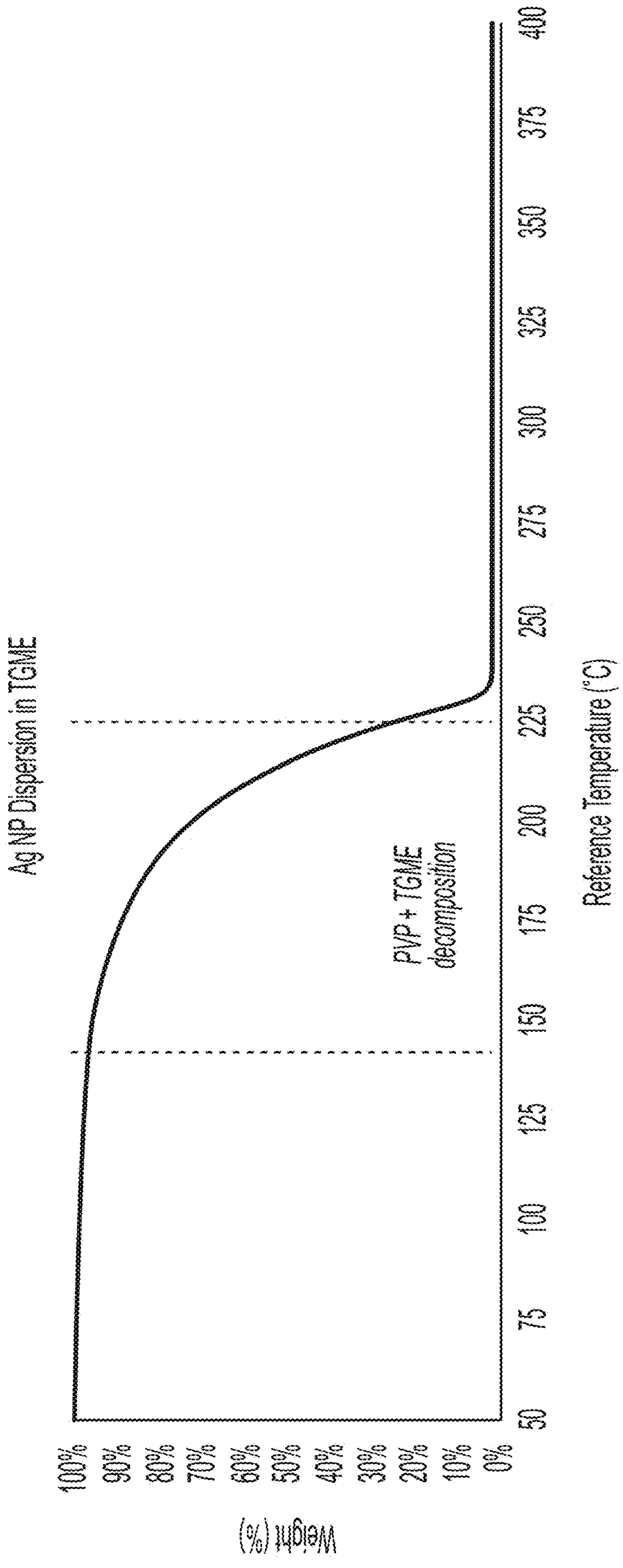
FIG. 3 is a graph that shows percent weight of PVP and TGME in the ink as it is heated by a laser.

It shall be understood that the final mixture will include PVP, TGME and the metal (e.g., silver). Application of the laser causes the weight percentage of PVP and TGME to start to decrease as the temperature of the film increases due to exposure to the laser as shown in FIG. 3. In FIG. 3, it is assumed that the temperature ramps up at 10 degrees ° C./minute.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±10%, 9%, 8%, 7%, 6%, or 5%, 4%, 3%, 2%, or 1% of a given value.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A method of forming a convertible ink:

performing a polyol process with a metal salt, a capping agent and a solvent to produce encapsulated nanospheres in a first solution;

reducing the amount of capping agent in the first aqueous solution by:

adding a first reducing agent soluble with the capping agent to the first solution to create a mixture and agitating the mixture via centrifugation to form a supernatant and a precipitate that includes the encapsulated nanospheres, wherein the first reducing agent is ethanol;

removing the supernatant;

after removing, adding a second reducing agent to the precipitate to form a second solution, wherein the second reducing agent is acetone;

agitating the second solution to form a second supernatant and a precipitate that includes the encapsulated nanospheres; and after agitating, removing the second supernatant.

2. The method of claim 1, wherein the capping agent is Polyvinylpyrrolidone (PVP).

3. A method of forming conductive traces on a substrate, the method comprising:

forming a convertible ink according to the method of claim 1;

applying the convertible ink to the substrate;

curing the convertible ink to form cured ink; and forming the conductive traces by exposing the cured ink to laser light.

4. The method of claim 3, wherein the laser light is produced by an 830 nm laser.

5. The method of claim 3, wherein the conductive traces are formed due to a net reduction in the capping agent in the convertible ink from exposure to the laser light.

6. The method of claim 3, further comprising:

heating the substrate, wherein the convertible ink is cured by applying the convertible ink to the heated substrate.

7. The method of claim 3, wherein the convertible ink is cured in a vacuum oven.

8. The method of claim 3, wherein the convertible is applied by aerosol jet printing.

* * * * *